(12) United States Patent
Roy et al.

(10) Patent No.: US 11,182,228 B2
(45) Date of Patent: Nov. 23, 2021

(54) SYSTEM AND METHOD FOR REMOTE PROCEDURE CALL FOR KEY-VALUE TARGET OVER NON-VOLATILE MEMORY EXPRESS OVER FABRICS

(71) Applicant: Samsung Electronics Co., Ltd., Yongin-si (KR)

(72) Inventors: Somnath Roy, San Ramon, CA (US); Harsh Roogi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/888,659

(22) Filed: May 29, 2020

(65) Prior Publication Data

US 2021/0303377 A1 Sep. 30, 2021

Related U.S. Application Data (60) Provisional application No. 63/003,192, filed on Mar. 31, 2020.

(51) Int. Cl.
  G06F 9/44 (2018.01)
  G06F 9/54 (2006.01)
  G06F 3/06 (2006.01)
  G06F 13/40 (2006.01)

(52) U.S. Cl.
  CPC ............ G06F 9/547 (2013.01); G06F 3/0604 (2013.01); G06F 3/0644 (2013.01); G06F 3/0679 (2013.01); G06F 9/541 (2013.01); G06F 13/4027 (2013.01); G06F 2209/544 (2013.01)

(58) Field of Classification Search
  CPC ...................................... G06F 9/547
  USPC .......................................................... 719/330
  See application file for complete search history.

(56) References Cited

U.S. PATENT DOCUMENTS

| 7,853,962 | B1 * | 12/2010 | Romano ................. | G06F 9/547 |
| | | | | 719/330 |
| 2010/0242055 | A1 * | 9/2010 | Aguilera ................. | G06F 9/547 |
| | | | | 719/330 |
| 2015/0106827 | A1 * | 4/2015 | Fiedel ..................... | G06F 9/547 |
| | | | | 719/330 |
| 2017/0034310 | A1 | 2/2017 | Victorelli | |

(Continued)

FOREIGN PATENT DOCUMENTS

CN 107483424 A 12/2017

OTHER PUBLICATIONS

Gottschling; Datadog; Key Metrics for Monitoring Consul; Jul. 10, 2019; 4 pps. https://www.datadoghq.com/blog/consul-metrics/.

*Primary Examiner* — Timothy A Mudrick
(74) *Attorney, Agent, or Firm* — Lewis Roca Rothgerber Christie LLP (57) ABSTRACT

Provided is a method of processing remote procedure calls (RPCs), the method including receiving a first RPC at a target from a first client, beginning execution of a first RPC procedure corresponding to the first RPC, receiving a second RPC at the target from a second client, and completing the execution of the first RPC procedure, and beginning execution of a second RPC procedure corresponding to the second RPC, the first RPC and the second RPC including the same parameter, or processing the first RPC procedure and the second RPC procedure in parallel, the first RPC and the second RPC including different respective parameters.

20 Claims, 3 Drawing Sheets

(56) References Cited

U.S. PATENT DOCUMENTS

2017/0034311 A1    2/2017  Govind et al.
2019/0146701 A1*  5/2019  Kanteti ................ G06F 3/0608
                                                                   711/154

\* cited by examiner

SYSTEM AND METHOD FOR REMOTE PROCEDURE CALL FOR KEY-VALUE TARGET OVER NON-VOLATILE MEMORY EXPRESS OVER FABRICS

CROSS-REFERENCE TO RELATED APPLICATION(S)

This application claims priority to and the benefit of U.S. Provisional Application Ser. No. 63/003,192, filed on Mar. 31, 2020, entitled "PLUGGABLE AND DYNAMICALLY LOADABLE REMOTE PROCEDURE CALL (RPC) FRAMEWORK FOR KEY VALUE (KV) OVER NON-VOLATILE MEMORY EXPRESS OVER FABRICS (NVMEOF)," the entire contents of which is incorporated herein by reference.

FIELD

One or more aspects of embodiments of the present disclosure relate generally to remote procedure calls over Non-Volatile Memory Express over Fabrics (e.g., remote procedure calls from clients to key-value targets).

BACKGROUND

A key-value (KV) device, such as a key-value solid state drive (KVSSD), implements an object-like storage scheme on the device, as opposed to reading and writing data blocks as requested by a host server or storage array controller. Also, a KVSSD may provide a KV interface at a device level, thereby providing improved performance and simplified storage management, thereby enabling the simplification of a conversion process (e.g., data conversion between object data and block data) by performing operations of the conversion process at the target KVSSD.

However, some key-value (KV) systems may be unable to perform various operations efficiently at the Non-Volatile Memory Express over Fabrics (NVMEof) key-value (NKV) target-side when KV drives are remote. The logic belongs to the client-side to perform these operations, and frequent network transfer may be used to complete the operations, thereby attributing numerous latencies.

The above information disclosed in this Background section is only for enhancement of understanding of the background of the disclosure, and therefore may contain information that does not form the prior art.

SUMMARY

Embodiments described herein provide improvements to data storage.

According to embodiments of the present disclosure, there is provided a method of processing remote procedure calls (RPCs), the method including receiving a first RPC at a target from a first client, beginning execution of a first RPC procedure corresponding to the first RPC, receiving a second RPC at the target from a second client, and completing the execution of the first RPC procedure, and beginning execution of a second RPC procedure corresponding to the second RPC, the first RPC and the second RPC including the same parameter, or processing the first RPC procedure and the second RPC procedure in parallel, the first RPC and the second RPC including different respective parameters.

The method may further include receiving a third RPC at the target from a third client, the third RPC being a long-running RPC corresponding to a third RPC procedure having a longer execution time than that of the first RPC procedure, and completing execution of the third RPC procedure after completion of the execution of the first RPC procedure, wherein a corresponding application is available to the first client or the second client during the execution of the third RPC procedure.

The method may further include returning a status to the third client based on a parameter of the third RPC.

The first RPC and the second RPC may include a first synchronous call and a second synchronous call, respectively, the first RPC and the second RPC including the same parameter.

The first RPC and the second RPC may include a first synchronous call and a second synchronous call, respectively, the first RPC and the second RPC including different respective parameters.

The first RPC and the second RPC may include a synchronous call and an asynchronous call, respectively, the first RPC and the second RPC including different respective parameters.

The execution of the first RPC procedure and the execution of the second RPC procedure may include loading an application programming interface (API) by the target during startup, or dynamically loading the API by the target during runtime.

The target, the first client, and the second client may be in a Non-Volatile Memory Express over Fabrics key-value (NKV) system.

According other embodiments of the present disclosure, there is provided a system for processing remote procedure calls (RPCs) in a Non-Volatile Memory Express over Fabrics key-value (NKV) system, the system including a target configured to receive a first RPC from a first client, begin execution of a first RPC procedure corresponding to the first RPC, receive a second RPC from a second client, and complete the execution of the first RPC procedure, and begin execution of a second RPC procedure corresponding to the second RPC, the first RPC and the second RPC including the same parameter, or process the first RPC procedure and the second RPC procedure in parallel, the first RPC and the second RPC including different respective parameters.

The target may be further configured to receive a third RPC from a third client, the third RPC being a long-running RPC corresponding to a third RPC procedure having a longer execution time than that of the first RPC procedure, and complete execution of the third RPC procedure after completion of the execution of the first RPC procedure, wherein a corresponding application is available to the first client or the second client during the execution of the third RPC procedure.

The target may be further configured to return a status to the third client based on a parameter of the third RPC.

The first RPC and the second RPC may include a first synchronous call and a second synchronous call, respectively, the first RPC and the second RPC including the same parameter.

The first RPC and the second RPC may include a first synchronous call and a second synchronous call, respectively, the first RPC and the second RPC including different respective parameters.

The first RPC and the second RPC may include a synchronous call and an asynchronous call, respectively, the first RPC and the second RPC including different respective parameters.

The target may be configured to complete the execution of the first RPC procedure and the execution of the second RPC procedure by loading an application programming interface (API) during startup, or dynamically loading the API during runtime.

According to yet other embodiments of the present disclosure, there is provided A non-transitory computer readable medium implemented on a target for processing remote procedure calls (RPCs) in an NKV system, the non-transitory computer readable medium having computer code that, when executed on a processor, implements a method of data storage, the method including receiving a first RPC at a target from a first client, beginning execution of a first RPC procedure corresponding to the first RPC, receiving a second RPC at the target from a second client, and completing the execution of the first RPC procedure, and beginning execution of a second RPC procedure corresponding to the second RPC, the first RPC and the second RPC including the same parameter, or processing the first RPC procedure and the second RPC procedure in parallel, the first RPC and the second RPC including different respective parameters.

The computer code, when executed on the processor, may further implement the method of data storage by receiving a third RPC at the target from a third client, the third RPC being a long-running RPC corresponding to a third RPC procedure having a longer execution time than that of the first RPC procedure, and completing execution of the third RPC procedure after completion of the execution of the first RPC procedure, wherein a corresponding application is available to the first client or the second client during the execution of the third RPC procedure.

The computer code, when executed on the processor, may further implement the method of data storage by returning a status to the third client based on a parameter of the third RPC.

The computer code, when executed on the processor, may be configured to complete the execution of the first RPC procedure and the execution of the second RPC procedure by loading an application programming interface (API) by the target during startup, or dynamically loading the API by the target during runtime.

The target, the first client, and the second client may be in a Non-Volatile Memory Express over Fabrics key-value (NKV) system.

Accordingly, the system and method of some embodiments of the present disclosure are able to complete pass-through from client side, obviate the need for traditional RPC headers or stub files, operate both synchronously and asynchronously, allow operations to be done locally within a remote target, and also provide the ability to trigger computing from the target side, thereby improving data storage technology.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, some key-value (KV) systems may be unable to perform various operations efficiently at the Non-Volatile Memory Express over Fabrics (NVMEof) key-value (NKV) target-side when KV drives are remote. The logic belongs to the client-side to perform these operations, and frequent network transfer may be used to complete the operations, thereby attributing numerous latencies.

According to some embodiments disclosed herein, however, operations, such as read-modify-write, filtering, batch, batch transaction, may be performed locally within a remote NKV target if the logic is embedded in the target. Performing such operations locally may significantly reduce network transfer back and forth from client to target, thereby improving latency. A scheme provided by the present disclosure may introduce an efficient RPC scheme for locally performing the operations. Some long-running compute and data intensive operation also may be triggered by asynchronous RPC APIs that are supported by this scheme.

A remote procedure call (RPC) may be sent over a network including one or more clients and one or more targets when a client seeks to access data that is not local to the client. As mentioned above, some key-value (KV) systems may be unable to perform certain operations at the target side when a target KV drive is remote. That is, KV drives may not be able to perform relatively data intensive operations on the target side (e.g., any read-modify-write operations that require a relatively large data transfer). Instead, the data is remotely accessed and sent to the client, reprocessed, and then sent back to the target. Accordingly, it may be useful to enable target-side operations in a KV system to enable read-modify-write operations to be performed locally, thereby reducing the amount of data moving through the network.

Embodiments of the present disclosure provide a specialized key-value (KV) application programming interface (API). Such a specialized KV API may be supported by using generic and specialized Non-Volatile Memory Express over Fabrics (NVMEof) KV command sets.

As described below, embodiments of the present disclosure enable the NVMEof KV (NKV) client side to be completely pass-through, meaning all operation logic may be ported to the target side as an RPC implementation, such that the client side may simply invoke the RPC with a proper parameter. Further, the support and implementation of the API in the NKV target side may be achieved via a pluggable framework, meaning that code for implementing the API for NKV uses a consistent interface that plugs into an existing framework library of an NKV system without requiring any recompilation or linking. For example, implementation of a method of embodiments of the present disclosure (e.g., an RPC API for NKV) may be loaded by an NKV target during startup, or may be dynamically loaded during runtime (e.g., for a shared object). Accordingly, new RPCs are able to be developed without changes to a code base of the NKV target (e.g., without rebuilding the NKV target code base and restarting/rebooting the NKV target).

Embodiments of the present disclosure may also obviate or reduce the need for RPC header or stub files (for example, a stub in distributed computing is a piece of code that converts parameters passed between client and server during an RPC), as the application is able to operate based only on information regarding the remote method name to execute. This may be achieved without additional information or complex parameters that may be otherwise used to identify a type of RPC (e.g., parameters relating to header or stub files) while using only GET/PUT buffers for reading/writing data from/to the NKV target. Additionally, although RPCs may otherwise be synchronous, the NKV RPC API according to embodiments of the present disclosure is able to operate both synchronously and asynchronously. Further, embodiments disclosed herein build an RPC framework that may have some standardized parameter set that is able to work with all of the RPC methods supported by the system, and without any need to maintain stub files etc. that may otherwise be needed for RPC implementation.

When KV drives are remote, RPC API for NKV allows various operations, such as read-modify-write, filtering, batch, batch transaction operations, etc., to be performed at the NKV target side (e.g., to be performed on KV drives), the NKV target side typically being physically closer to the relevant storage device(s) than to the relevant NKV client.

More generally, by implementing RPC API for NKV, operations no longer need any client/application intervention, and the operations are able to be done locally within a remote NKV target.

RPC API for NKV, according to embodiments of the present disclosure, also provides the ability to trigger computing and data intensive operations, such as scrubbing, healing, load-balancing, etc. from the NKV-target side asynchronously. Accordingly, the RPC API for NKV is able to eliminate unnecessary network traffic between the host and the remote KV drives, thereby enabling a more performant and more reliable system by eliminating various network uncertainties.

Figure 1:
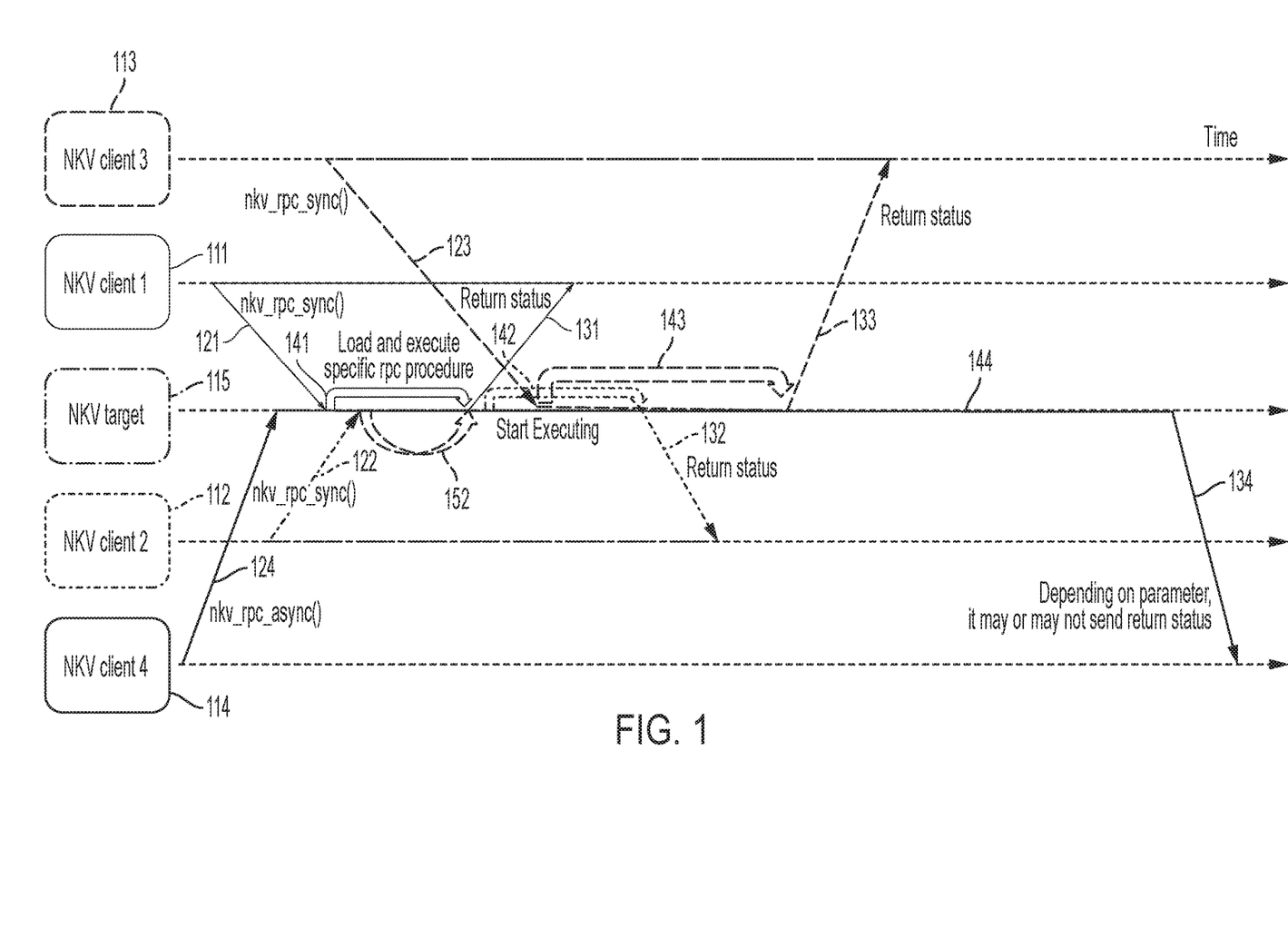
FIG. 1 shows a timing diagram depicting serial and parallel processing of respective synchronous and asynchronous remote procedure calls (RPCs) according to some embodiments of the present disclosure.

FIG. 1 shows a timing diagram depicting serial and parallel processing of respective synchronous and asynchronous remote procedure calls (RPCs) according to some embodiments of the present disclosure.

Referring to FIG. 1, four different clients (e.g., NKV client 1/a first NKV client 111, NKV client 2/a second NKV client 112, NKV client 3/a third NKV client 113, and NKV client 4/a fourth NKV client 114) are shown. The four different NKV clients 111, 112, 113, 114 may respectively send first through fourth RPCs 121, 122, 123, 124 to a single NKV target 115 (e.g., a server or an NKV target).

In the present example, the first NKV client 111 initially calls a first RPC 121. The first RPC may be a first synchronous call 121 (e.g., a first synchronous call, nkv_rpc_sync( )). The NKV target 115 then loads and executes the first RPC procedure 141 in accordance with the first synchronous call 121 of the first NKV client 111. When the NKV target 115 is finished, the NKV target 115 returns a first status 131 to the first NKV client 111.

As used herein, an RPC is synchronous when code execution will wait for an API call to return before continuing. Accordingly, until a response is returned, the application will not perform any further executions, which may be perceived by the user/client as latency or performance lag. This may be used, for example, if there is code can only be executed properly once an API response is received.

Furthermore, while the NKV target 115 is loading and executing the first RPC procedure 141 in accordance with the first synchronous call 121 of the first NKV client 111, a second RPC/second synchronous call 122 is received by the NKV target 115 from the second NKV client 112. Because the RPC that is the second synchronous call 122 is the same as the RPC that is the first synchronous call 121 that is received from the first NKV client 111 (e.g., both the first and second synchronous calls 121, 122 may be on a same set of RPC parameters), the second RPC procedure 142 to be loaded and executed by the NKV target 115 in response to the second synchronous call 122 needs synchronization with the first RPC procedure 141 in accordance with the first synchronous call 121. Accordingly, the NKV target 115 waits 152 until completion of the first synchronous call 121 for the first NKV client 111 before the NKV target 115 begins executing the second RPC procedure 142 corresponding to the second synchronous call 122 from the second NKV client 112.

Then, while the NKV target 115 is executing the second RPC procedure 142 corresponding to the second synchronous call 122 from the second NKV client 112, the NKV target 115 receives a third RPC 123 from the third NKV client 113. In the present example, the third RPC 123 received from the third NKV client 113 is a third synchronous call 123 (nkv_rpc_sync( ). However, because the third synchronous call 123 from the third NKV client 113 corresponds to a method or parameter that is different from that of the first and second synchronous calls 121, 122 of the first and second NKV clients 111, 112, there need not be synchronization with the third synchronous call 123 from the third NKV client 113.

Accordingly, the NKV target 115 is able to begin processing of the third synchronous call 123 while the NKV target 115 is still executing the second RPC procedure 142 corresponding to the second synchronous call 122 from the second NKV client 112. That is, the second and third RPC procedures 142, 143 corresponding to the second and third synchronous calls 122, 123 may be processed in parallel. Accordingly, because the NKV target 115 is able to process the second and third synchronous calls 122, 123 from the second and third NKV clients 112, 113, the NKV target 115 completes processing of the second synchronous call 122 from the second NKV client 112, and returns a second status 132 to the second NKV client 112 while continuing to process the third RPC procedure 143 of the third synchronous call 123 from the third NKV client 113. Upon completing the third synchronous call 123 from the third NKV client 113, the NKV target 115 returns a third status 133 to the third NKV client 113.

Furthermore, in the present example, prior to receiving any of the first, second, or third synchronous calls 121, 122, 123, the NKV target 115 receives a long-running RPC as the fourth RPC 124 (nkv_rpc_async( )) from a fourth NKV client 114 (e.g., the fourth RPC 124 may be a call with a long-running process, such as a scrubbing process).

In the present example, the long-running RPC 124 is an asynchronous call 124. Unlike synchronous calls, asynchronous calls do not wait for the RPC to return from the NKV target 115. Accordingly, execution is able to continue on the application, and when the call eventually returns from the NKV target 115, a "callback" function may be executed. Accordingly, the application is not blocked during completion of the execution of the fourth RPC procedure 144 corresponding to the long-running RPC 124. Further, depending on a parameter associated with the fourth RPC 124, the NKV target 115 may or may not return a fourth status 134 to the fourth NKV client 114 upon processing of the fourth RPC 124.

Figure 2:
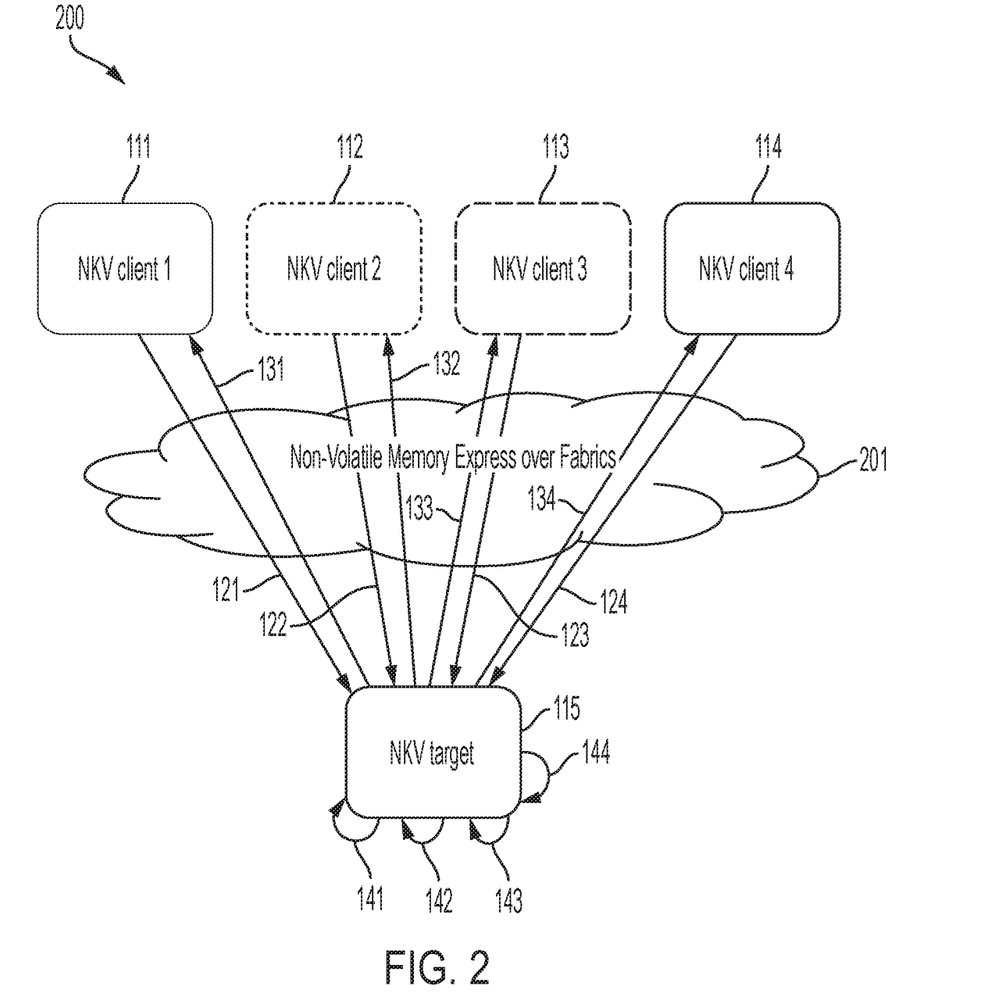
FIG. 2 shows a block diagram depicting serial and parallel processing of respective synchronous and asynchronous RPCs according to some embodiments of the present disclosure.

FIG. 2 shows a block diagram depicting serial and parallel processing of respective synchronous and asynchronous RPCs according to some embodiments of the present disclosure.

Referring to FIG. 2, first through fourth NKV clients 111, 112, 113, 114 respectively send first through fourth RPCs 121, 122, 123, 124 to a single NKV target 115 via the NVMEof 201 to enable execution of first through fourth RPC procedures by the NKV target 115. Further, upon completion of the first through fourth RPC procedures 141, 142, 143, 144 respectively corresponding to the first through fourth RPCs 121, 122, 123, 124, the NKV target 115 may return statuses 131, 132, 133, 134 to the respective NKV clients 111, 112, 113, 114.

As discussed above with respect to FIG. 1, the NKV target 115 may begin executing the first RPC procedure 141 in accordance with the first RPC/first synchronous call 121 prior to the second RPC/second synchronous call 122 being received by the NKV target 115 from the second NKV client 112. The second RPC 122 may have the same parameter as the first RPC 121, and the NKV target 115 may wait until completion of the first RPC procedure 141 before beginning execution of a second RPC procedure 142 corresponding to the second RPC 122. Upon completing execution of the first RPC procedure 141, the NKV target 115 may send may return the first status 131 to the first NKV client 111.

Further, the NKV target 115 may receive a third RPC 123 from the third NKV client 113 (e.g., while executing the second RPC procedure 142 corresponding to the second synchronous call 122 from the second NKV client 112). When the third synchronous call 123 from the third NKV client 113 corresponds to a method or parameter that is different from that of the second synchronous call 122 of the second NKV client 112, the NKV target 115 is able to begin a third RPC procedure 143 corresponding to the third synchronous call 123 while the NKV target 115 is still executing the second RPC procedure 142 corresponding to the second synchronous call 122 from the second NKV client 112. Upon completing execution of the second and third RPC procedures 142, 143, the NKV target 115 may return the second and third statuses 132, 133 to the second and third NKV clients 112, 113, respectively.

Further, the NKV target 115 may receive a fourth RPC 124 from the fourth NKV client 114. The fourth RPC 124 may be an asynchronous call that is received before the first through third RPCs 121, 122, 123. Accordingly, the NKV target 115 may complete execution of the fourth RPC procedure 144 while the application is not blocked, and then may or may not return the fourth status 134 to the fourth NKV client 114 upon completion of the execution of the fourth RPC procedure 144.

Figure 3:
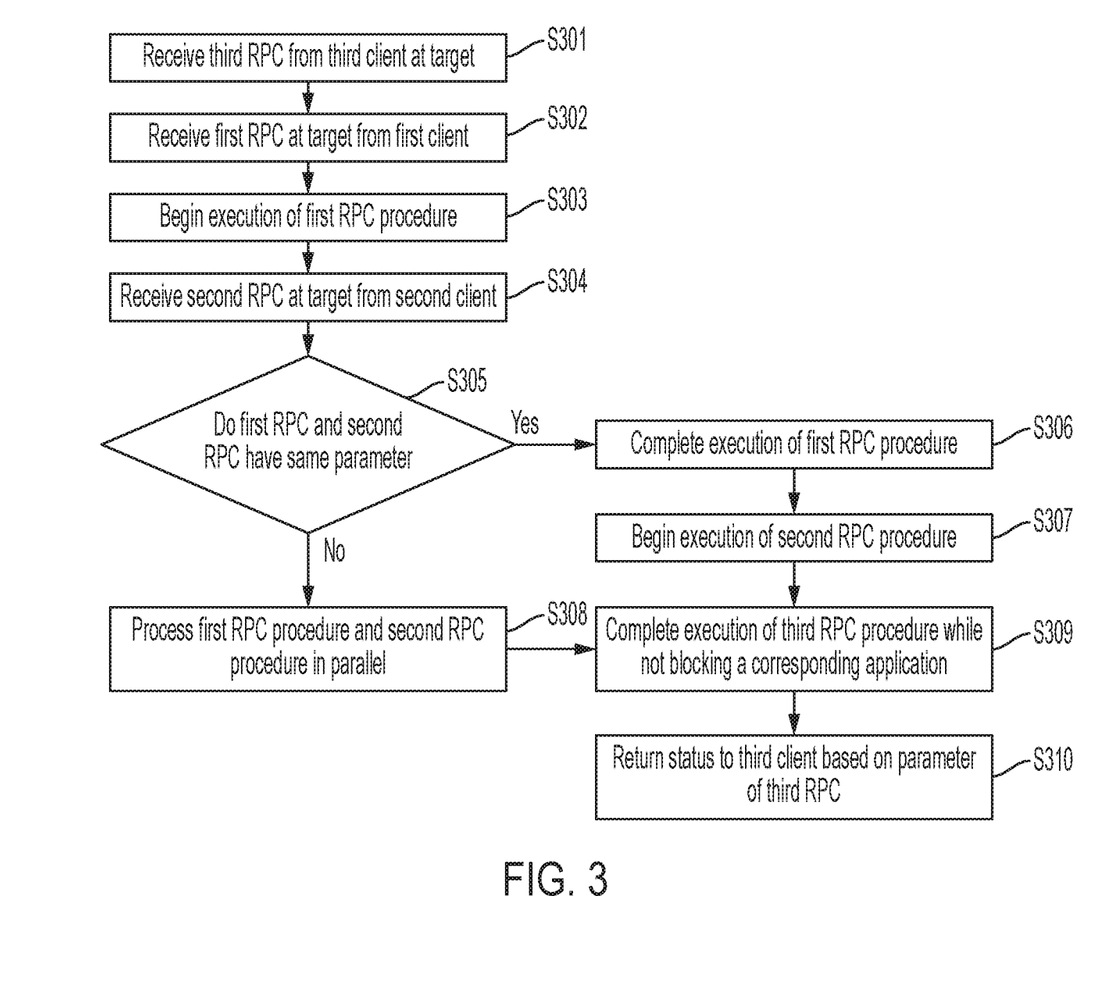
FIG. 3 shows a flow chart depicting a method of processing RPCs according to some embodiments of the present disclosure.

FIG. 3 shows a flow chart depicting a method of processing RPCs according to some embodiments of the present disclosure.

Referring to FIG. 3, at S301, a target may receive a third RPC from a third client (first and second RPCs from first and second clients being described below), the third RPC possibly being a long-running RPC corresponding to a third RPC procedure having a relatively long execution time (e.g., the NKV target 115 may receive the long-running RPC 124 corresponding to the fourth RPC procedure 144 from the fourth NKV client 114, as described with respect to FIGS. 1 and 2).

At S302, the target may receive a first RPC from a first client (e.g., the NKV target 115 may receive the first synchronous call 121 from the first NKV client 111, as described with respect to FIGS. 1 and 2). At S303 the target may begin execution of the first RPC procedure (e.g., the NKV target 115 may begin execution of the first RPC procedure 141 in accordance with the first synchronous call 121).

At S304, the target may receive a second RPC from a second client (e.g., the NKV target 115 may receive the second synchronous call 122 from the second NKV client 112, or may receive the third synchronous call 123 from the third NKV client 113, as described with respect to FIGS. 1 and 2).

At S305, it may be determined whether the first RPC and the second RPC have the same parameter. If it is determined at S305 that the first RPC and the second RPC have the same parameter (yes), at S306, the target may complete execution of the first RPC procedure, and at S307, the target may begin execution of the second RPC procedure (e.g., the NKV target 115 may begin execution of the second RPC procedure 142 corresponding to the second synchronous call 122 from the second NKV client 112).

However, if it is determined at S305 that the first RPC and the second RPC have different respective parameters (no), at S308, the first RPC procedure and the second RPC procedure may be processed by the target in parallel (e.g., the NKV target 115 may process the first RPC procedure 141 in accordance with the first synchronous call 121 in parallel with the third RPC procedure 143 of the third synchronous call 123 from the third NKV client 113). Whether the first and second RPC procedures are processed serially or in parallel, the execution of the and second RPC procedures may include loading an application programming interface (API) by the target during startup, or dynamically loading the API by the target during runtime.

At 309, the target may complete execution of the third RPC procedure while not blocking a corresponding application (e.g., the NKV target 115 may complete the execution of the fourth RPC procedure 144 corresponding to the long-running RPC 124). At S310, the target may return the status to the third client based on a parameter of the third RPC (e.g., the NKV target 115 may return the fourth status 134 to the fourth NKV client 114). The target and the various clients may be in a Non-Volatile Memory Express over Fabrics key-value (NKV) system (e.g., the NKV system 200 of FIG. 2).

Thus, embodiments of the present disclosure enable complete pass-through from client side, obviate the need for traditional RPC headers or stub files, are able to operate both synchronously and asynchronously, allow operations to be done locally within a remote target, and also provides the ability to trigger computing from the target side. Further, the embodiments described herein provide a dynamically pluggable framework to enable the addition of new RPC methods without needing to restart the target software of the target. Additionally, there is no need to introduce a new NVMEof KV command set for each new RPC, as the RPC parameters may be standardized. Also, the embodiments disclosed herein may operate despite only the client ensuring that any new RPCs are called with proper parameters. That is, the target may access one or more of a set of standardized parameters from an RPC by receiving and reading the RPC, the parameter(s) thereby enabling the execution of a corresponding RPC procedure by the target While the present disclosure has been particularly shown and described with reference to some example embodiments thereof, it will be understood by those of ordinary skill in the art that various changes in form and details may be made therein without departing from the spirit and scope of the present disclosure as set forth in the following claims and their equivalents.

What is claimed is:

1. A method of processing remote procedure calls (RPCs), the method comprising:
   receiving a first RPC at a target from a first client;
   beginning execution of a first RPC procedure corresponding to the first RPC;

receiving a second RPC at the target from a second client; and completing the execution of the first RPC procedure; and beginning execution of a second RPC procedure corresponding to the second RPC, the first RPC and the second RPC comprising the same parameter; or processing the first RPC procedure and the second RPC procedure in parallel, the first RPC and the second RPC comprising different respective parameters.

2. The method of claim 1, further comprising:

receiving a third RPC at the target from a third client, the third RPC being a long-running RPC corresponding to a third RPC procedure having a longer execution time than that of the first RPC procedure; and completing execution of the third RPC procedure after completion of the execution of the first RPC procedure, wherein a corresponding application is available to the first client or the second client during the execution of the third RPC procedure.

3. The method of claim 2, further comprising returning a status to the third client based on a parameter of the third RPC.

4. The method of claim 1, wherein the first RPC and the second RPC comprise a first synchronous call and a second synchronous call, respectively, the first RPC and the second RPC comprising the same parameter.

5. The method of claim 1, wherein the first RPC and the second RPC comprise a first synchronous call and a second synchronous call, respectively, the first RPC and the second RPC comprising different respective parameters.

6. The method of claim 1, wherein the first RPC and the second RPC comprise a synchronous call and an asynchronous call, respectively, the first RPC and the second RPC comprising different respective parameters.

7. The method of claim 1, wherein the execution of the first RPC procedure and the execution of the second RPC procedure comprises loading an application programming interface (API) by the target during startup, or dynamically loading the API by the target during runtime.

8. The method of claim 1, wherein the target, the first client, and the second client are in a Non-Volatile Memory Express over Fabrics key-value (NKV) system.

9. The method of claim 1, further comprising receiving, at the target, the parameter of the first RPC by reading the first RPC, the parameter of the first RPC enabling the execution of the first RPC procedure by the target.

10. A system for processing remote procedure calls (RPCs) in a Non-Volatile Memory Express over Fabrics key-value (NKV) system, the system comprising a target configured to:

receive a first RPC from a first client;

begin execution of a first RPC procedure corresponding to the first RPC;

receive a second RPC from a second client; and complete the execution of the first RPC procedure; and begin execution of a second RPC procedure corresponding to the second RPC, the first RPC and the second RPC comprising the same parameter; or process the first RPC procedure and the second RPC procedure in parallel, the first RPC and the second RPC comprising different respective parameters.

11. The system of claim 10, wherein the target is further configured to:

receive a third RPC from a third client, the third RPC being a long-running RPC corresponding to a third RPC procedure having a longer execution time than that of the first RPC procedure; and complete execution of the third RPC procedure after completion of the execution of the first RPC procedure, wherein a corresponding application is available to the first client or the second client during the execution of the third RPC procedure.

12. The system of claim 10, wherein the first RPC and the second RPC comprise a first synchronous call and a second synchronous call, respectively, the first RPC and the second RPC comprising the same parameter.

13. The system of claim 10, wherein the first RPC and the second RPC comprise a first synchronous call and a second synchronous call, respectively, the first RPC and the second RPC comprising different respective parameters.

14. The system of claim 10, wherein the first RPC and the second RPC comprise a synchronous call and an asynchronous call, respectively, the first RPC and the second RPC comprising different respective parameters.

15. The system of claim 10, wherein the target is configured to complete the execution of the first RPC procedure and the execution of the second RPC procedure by loading an application programming interface (API) during startup, or dynamically loading the API during runtime.

16. A non-transitory computer readable medium implemented on a target for processing remote procedure calls (RPCs) in an NKV system, the non-transitory computer readable medium having computer code that, when executed on a processor, implements a method of data storage, the method comprising:

receiving a first RPC at a target from a first client;

beginning execution of a first RPC procedure corresponding to the first RPC;

receiving a second RPC at the target from a second client; and completing the execution of the first RPC procedure; and beginning execution of a second RPC procedure corresponding to the second RPC, the first RPC and the second RPC comprising the same parameter; or processing the first RPC procedure and the second RPC procedure in parallel, the first RPC and the second RPC comprising different respective parameters.

17. The non-transitory computer readable medium of claim 16, wherein the computer code, when executed on the processor, further implements the method of data storage by:

receiving a third RPC at the target from a third client, the third RPC being a long-running RPC corresponding to a third RPC procedure having a longer execution time than that of the first RPC procedure; and completing execution of the third RPC procedure after completion of the execution of the first RPC procedure, wherein a corresponding application is available to the first client or the second client during the execution of the third RPC procedure.

18. The non-transitory computer readable medium of claim 17, wherein the computer code, when executed on the processor, further implements the method of data storage by returning a status to the third client based on a parameter of the third RPC.

19. The non-transitory computer readable medium of claim 16, wherein the computer code, when executed on the processor, is configured to complete the execution of the first RPC procedure and the execution of the second RPC procedure by loading an application programming interface (API) by the target during startup, or dynamically loading the API by the target during runtime.

20. The non-transitory computer readable medium of claim 16, wherein the target, the first client, and the second client are in a Non-Volatile Memory Express over Fabrics key-value (NKV) system.

\* \* \* \* \*